W. C. CRANSTON.
SHOCK ABSORBER.
APPLICATION FILED JUNE 26, 1917.
1,259,367.
Patented Mar. 12, 1918.
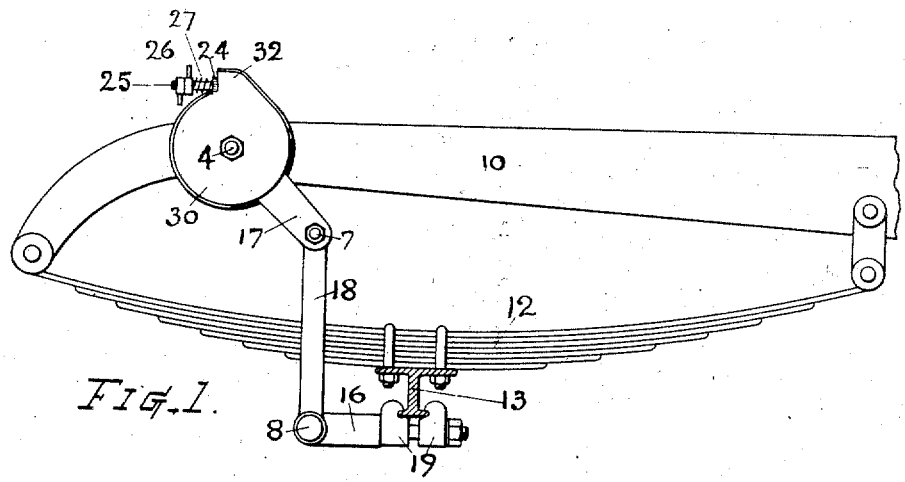
Fig. 1.
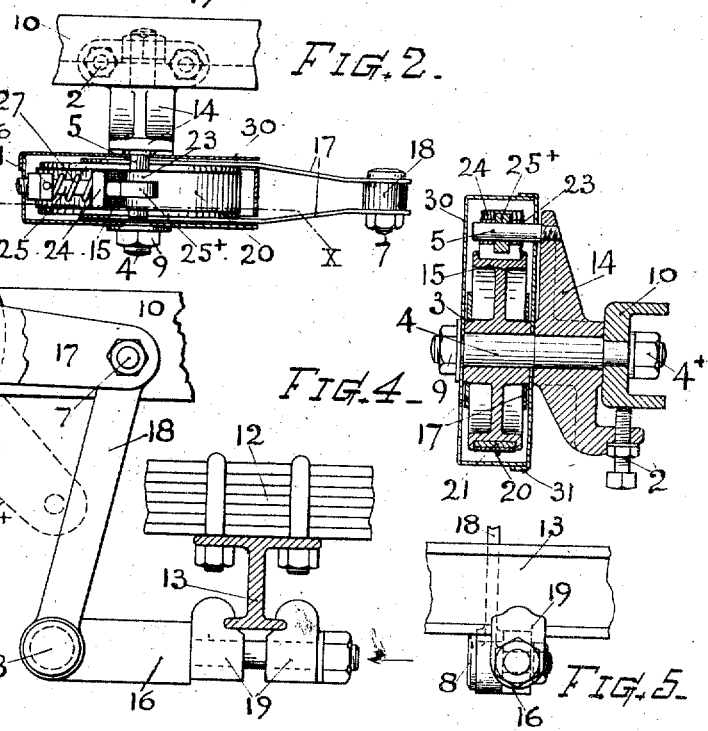
Fig. 2.
Fig. 3.
Fig. 4.
Fig. 5.
Inventor.
Walter C. Cranston.
by Chas. H. Burleigh
Attorney.

UNITED STATES PATENT OFFICE.

WALTER C. CRANSTON, OF WORCESTER, MASSACHUSETTS, ASSIGNOR OF ONE-HALF TO HERMAN STAKE, OF WORCESTER, MASSACHUSETTS.

SHOCK-ABSORBER.

1,259,367.  Specification of Letters Patent.  Patented Mar. 12, 1918.

Application filed June 26, 1917. Serial No. 177,121.

*To all whom it may concern:*

Be it known that I, WALTER C. CRANSTON, a citizen of the United States, residing at Worcester, in the county of Worcester and State of Massachusetts, have invented certain new and useful Improvements in Shock-Absorbers, of which the following is a specification.

This invention relates to that class of shock-absorbers in which a swinging arm and rotatively acting friction means are connected with the respective parts of a motor vehicle for overcoming the sudden rebound action of the vehicle-supporting springs; and my present invention consists in the novel construction and organization of the mechanism as hereinafter explained; the object being to provide a simple, efficient, inexpensive and conveniently regulatable appliance adapted for ready attachment to motor vehicles of various styles.

In the drawings, Figure 1 represents a side view of the device as applied for use. Fig. 2 is a plan view of the shock-absorber mechanism, with the outer casing in section. Fig. 3 is a vertical section at line X on Fig. 2. Fig. 4 is a vertical section at line Y Y on Fig. 3, and Fig. 5 is a fragmentary end view looking in the direction of the arrow, of the lower attaching member upon the axle.

In referring to the drawings, the numeral 10 indicates the chassis or body frame; 12 the body-supporting spring; and 13 the axle of an automobile, or any vehicle upon which the shock-absorber may be employed; the device being applicable to either front or rear axles and springs in similar manner to that shown. Numeral 14 indicates the body bracket for attachment of the absorber head to the chassis 10. A central axis-stud 4 is rigidly supported in said bracket; also a stationary pin 5 is fixed therein in parallel relation to said stud, but positioned outside of the circle of the frictional faces and near the periphery of the casing.

The bracket may be attached to the chassis in any efficient manner; preferably by extending the end of the axis-stud 4 through a hole in the web of the chassis and secured with a nut $4^+$ threaded upon its end; also by set-screws 2 threaded through an underlying flange on the bracket, and impinging against the under side of the chassis (see Figs. 2 and 4.)

15 indicates the friction wheel or drum having a cylindrical face with circumferential flanges at the sides thereof; the hub of said drum being formed with hexagonal or equivalent shaped engageable ends at 3. Said drum 15 is mounted upon the axis-stud 4 to have rotative movement. The drum-actuating arm 17 is of dual form, composed of two flat metal members each having an opening at its inner end adapted to countermatch and engage the respective hexagonal ends 3 of the hub, so that the drum is embraced between the two members and moves with the action of the arm. A connecting link or bar 18 has its upper end pivoted at 7 between the dual members at the outer end of the arm 17, and its lower end at 8 pivotally attached to a stud or bracket 16 which is rigidly secured to the axle 13, preferably by clamp devices 19, as indicated in Figs. 3 and 5, so that the rise and fall of the vehicle body or chassis 10 by the springing action, will effect a swinging action of the arm, in well known manner, and the consequent movement of the friction drum.

Numeral 20 indicates the friction-band arranged about the drum 15, and composed of a flexible uniformly sized strip of metal, preferably a ribbon of sheet brass about one sixteenth of an inch thick, more or less, and a thin lining 21 of "raybestos" or other well known frictional material is attached to the inner face of the metal band. The width of the band approximately corresponds with the width of the cylindrical face of the drum between the flanges. One end of the band strip 20 is formed with a furcated loop 23, and retained upon the stationary pin 5, while the other end of said strip has a concentrically curved non-flexible reinforce plate 22 attached thereto which terminates with an outwardly projecting transversely disposed head or flange 24, as best shown in Figs. 2 and 3. Thus one end is held at fixed position in relation to the body bracket and the other end is movable to a small degree.

A band-regulating bolt 25, having a transversely perforated head $25^+$, is arranged upon the stationary pin 5, between the furcated members of the band-attaching loop 23, and the stem of said bolt extends through an opening in the head 24 on the opposite end of said band, and projects some distance beyond; its outer end being screw-threaded and having adjusting nuts 26 fitted thereon.

A push spring 27 is arranged about the bolt between the nuts and outer side of the head 24 to give resistance against the latter, and a yielding frictional tension for the band. The nuts 26 are preferably made so that they can be turned with the fingers.

The mechanism is inclosed within a casing 30, formed in two parts, of sheet metal with a slip joint at 31. The outer part of the casing can be readily taken off by first removing the nut 9 on the end of the axis stud 4. The casing has an opening, or openings, in its side to permit the swing of the arm 17; and is provided at its upper part with a peripheral protuberant portion 32 having an opening at the end thereof from which the band-tightener bolt 25 and nuts 26 project, so as to be conveniently accessible for regulating the frictional tension at any time when required, according to the load carried.

The position of the arm 17, as shown in Fig. 1 and indicated by dotted lines 17+ on Fig. 3, is approximately that assumed when the body is elevated; and the position shown by full lines in Fig. 3 is approximately that assumed when the body is depressed.

In the operation; with the movement of the body 10 downward, or toward the spring 12, the drum 15 turns toward the fixed end of the band 20 and there is practically free action as the band loosens its friction upon the drum; but when the movement of the body is upward the drum turns toward the spring-pressed head 24, or away from the fixed end of the band causing the band to tighten about the drum and frictionally to resist any quick action; thereby absorbing or overcoming the shock. The degree of resistance is readily regulated by the conveniently accessible nuts 26, which may be turned to increase or decrease the available space for the spring 27.

A threaded bolt with a coil spring thereon has been heretofore employed as a means for regulating frictional tension in shock absorbers of different constructions; therefore such means is not broadly of my invention, but in its peculiar arrangement is claimed as an element in the specific combination described.

I claim—

1. A shock-absorber, comprising, in combination substantially as described, a body bracket, means for affixing it upon a vehicle frame or chassis, an axis-stud supported in said bracket, a cylindrical-faced drum rotatively mounted on said axis-stud, a dual membered arm engaging the polygonal ends on the hub of said drum, a stationary eccentrically located pin fixed in said bracket, a flexible metal-ribbon band having a frictional lining surrounding the face of the drum, one end of said band secured to said stationary pin, its other end provided with an outwardly projecting head disposed adjacent to said pin, a tension-bolt connected with said pin and extending through an opening in said head, means upon said bolt for regulating the tension of the head, and means for connecting the outer end of said dual-membered arm with the vehicle axle.

2. In a shock-absorber of the character described, the combination with the body member and axis stud fixed therein, the rotatively actuated friction-drum, a friction band consisting of a uniformly flexible strip of thin sheet metal having an attached lining of frictional material disposed about said drum, one end of said band having a furcated loop, its other end having a concentrically curved non-flexible reinforce and outwardly projecting head, a transversely disposed stationary pin upon which the looped end of the band is supported in fixed relation adjacent the periphery of said drum, a tension-bolt arranged through the outwardly projecting head of the band, the head of said bolt being mounted together with the looped end of the band, upon the stationary pin, its stem provided with an adjusting nut threaded thereon, and a push spring disposed between the nut and projecting head of said friction band.

3. In a shock-absorber, the combination as described, of the body element adapted for attachment to the chassis of a motor vehicle, a center axis stud fixed in said body element, its rear end extended and adapted for securing the body to the chassis, an eccentrically located stationary pin fixed in said body parallel with said axis-stud, a lever-actuated cylindrical friction drum mounted upon said axis stud, a radially projecting lever-arm united to said drum, a pivotally attached link connecting said lever-arm and a lower member, means for attaching said lower member to the vehicle axle, a flexible metal-ribbon band extending around the cylindrical frictional face of the drum, its ends adjacent each other, one end of said band being movable and having an outwardly offset head, its other end being retained in fixed position by a loop surrounding said stationary pin, a band-tightener bolt having its head mounted upon said stationary pin, its stem extending through the offset head of said friction band, and a regulating means arranged upon said bolt.

4. The combination with shock-absorber mechanism, including an attaching bracket, a central axis stud and eccentrically located pin rigidly fixed in said bracket, the cylindrical faced drum, flexible non-rotatable friction band, and tension regulating bolt supported upon said fixed pin; of an inclosing casing of approximately circular form with a protuberant peripheral portion having an opening at the end thereof through which the end of the regulating bolt and its adjusting nut project for convenient access thereto.

5. The combination as described, of the rigid body-bracket, central axis-stud supported therein, an eccentrically located stationary pin fixed in said body-bracket, a centrally supported oscillatable cylindrical drum, an actuating arm connected for moving said drum, a metal ribbon frictional band about the face of said drum, one of its ends retained upon said stationary pin, its floating opposite end retained by a tension regulating means mounted upon said pin, an incasing box having a removable front cover, the central axis-stud upon which said drum is mounted being adapted for attaching the body bracket to the chassis, and for securing the front cover of the incasing box.

Witness my hand this 21st day of June, 1917.

WALTER C. CRANSTON.